United States Patent
Kurihara

(10) Patent No.: US 8,842,316 B2
(45) Date of Patent: Sep. 23, 2014

(54) IMAGE FORMING APPARATUS

(75) Inventor: Susumu Kurihara, Hino (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 350 days.

(21) Appl. No.: 13/277,410

(22) Filed: Oct. 20, 2011

(65) Prior Publication Data

US 2012/0099151 A1    Apr. 26, 2012

(30) Foreign Application Priority Data

Oct. 25, 2010    (JP) .................................. 2010-238187

(51) Int. Cl.
- G06F 3/12 (2006.01)
- G06K 15/16 (2006.01)
- B41J 3/60 (2006.01)
- H04N 1/203 (2006.01)
- G06K 15/02 (2006.01)
- H04N 1/00 (2006.01)
- G06K 15/12 (2006.01)

(52) U.S. Cl.
CPC . B41J 3/60 (2013.01); G06K 15/16 (2013.01); H04N 1/2032 (2013.01); G06K 15/1894 (2013.01); H04N 1/00278 (2013.01); H04N 1/0062 (2013.01); H04N 1/00347 (2013.01); G06K 15/12 (2013.01); H04N 1/0058 (2013.01); H04N 1/00631 (2013.01)
USPC ........................................................ 358/1.15

(58) Field of Classification Search
None
See application file for complete search history.

(56) References Cited

U.S. PATENT DOCUMENTS

2004/0165906 A1 *    8/2004    Shibata ........................... 399/82

FOREIGN PATENT DOCUMENTS

JP    2001-310531 A    11/2001

OTHER PUBLICATIONS

JP2010036995—abstract, Sakamoto, Feb. 18, 2010.*

* cited by examiner

*Primary Examiner* — Fan Zhang
(74) *Attorney, Agent, or Firm* — Holtz Holtz Goodman & Chick PC

(57) ABSTRACT

An image forming system includes a first image forming apparatus located upstream and a second image forming apparatus located downstream in a sheet conveying direction to perform a both-side printing operation. The system further includes a control section for judging whether a predetermined processing step serving as a judgment criterion has been completed with respect to an image to be formed on a subsequent sheet in each of the apparatuses, and for performing a control to start image forming operation on the subsequent sheet when judging that the predetermined processing step has been completed, and a processing step serving as the judgment criterion for the image to be formed in the second image forming apparatus is located in a step prior to a processing step serving as the judgment criterion for the image to be formed in the first image forming apparatus.

5 Claims, 5 Drawing Sheets

IMAGE FORMING APPARATUS

BACKGROUND

1. Field of the Invention

The present invention relates to an image forming system.

2. Description of Related Art

When an image forming apparatus cannot finish preparation of an image before a time when the image is written to a sheet, the image forming apparatus has to stop the sheet having been fed at a position in advance of a writing position (a position where writing processing is performed). As a result, a subsequent sheet catches up with the preceding sheet, which causes jam and reduces productivity.

In order to avoid such circumstance, a conventional image forming apparatus requires, as a condition of sheet feeding, that an output buffer (semiconductor memory) located immediately before an image forming unit stores an image corresponding to a sheet to be fed. In both-side printing operation, the condition of sheet feeding is that the output buffer stores images of both front and back sides (for example, Japanese Patent Application Laid-Open Publication No. 2001-310531).

Meanwhile, in recent years, an image forming system (series tandem system) configured by connecting two image forming apparatuses has been suggested. This image forming system is configured such that, in both-side printing operation, for example, the first image forming apparatus located upstream in sheet conveying direction prints a front surface of a sheet, and the second image forming apparatus located downstream in sheet conveying direction prints a back surface of the sheet. Since printing operations to the front and back sides of the sheet are shared by the respective image forming apparatuses, the productivity can be improved as compared with a case where both-side printing operation is performed with only one image forming apparatus. In general, such image forming system is applied to Production Printing (PP) machine, which pursues high productivity.

In the series tandem system, each of the first image forming apparatus and the second image forming apparatus is provided with an image processing unit for processing of preparation of an image for imaging and an image forming unit for forming the image on a sheet, and the image forming apparatuses have the image forming units at different positions with respect to the sheet conveying direction. Accordingly, preparation of an image to be formed in the second image forming apparatus provided downstream in the sheet conveying direction does not need to be completely finished, namely, does not need to be in a state ready to be used by the image forming section, in the stage of sheet feeding. In spite of the above fact, if the image forming apparatuses start feeding operation upon waiting for completion of preparation of the images for both of the image forming apparatuses, high degree of productivity cannot be achieved.

SUMMARY

An object of the present invention is to improve productivity of an image forming system including a plurality of image forming apparatuses connected to one another in series.

In order to achieve at least one of the abovementioned objects, an image forming system in which one aspect of the present invention is reflected is an image forming system including: a first image forming apparatus located upstream in a sheet conveying direction; and a second image forming apparatus located downstream in the sheet conveying direction, wherein the first image forming apparatus forms an image on one surface of a sheet, and thereafter the second image forming apparatus forms an image on the other surface of the sheet, thus performing a both-side printing operation, wherein the image forming system further comprises a control section for judging whether a predetermined processing step serving as a judgment criterion has been completed with respect to an image to be formed on a subsequent sheet in each of the first image forming apparatus and the second image forming apparatus, and for performing a control to start image forming operation on the subsequent sheet when the control section judges that the predetermined processing step serving as the judgment criterion has been completed, and wherein a processing step serving as the judgment criterion for the image to be formed in the second image forming apparatus is located in a step prior to a processing step serving as the judgment criterion for the image to be formed in the first image forming apparatus.

Preferably, when the control section judges that the predetermined processing step has been completed with respect to the image to be formed on the subsequent sheet in each of the first image forming apparatus and the second image forming apparatus, the control section performs a control to start feeding the subsequent sheet.

Preferably, the image forming system further includes a hard disk for saving the image to be formed, and the predetermined processing step serving as the judgment criterion for the image to be formed in the second image forming apparatus is a step of saving the image to the hard disk.

Preferably, the image forming system further includes a print controller for performing rasterizing processing to the image to be formed to transmit the image to the first image forming apparatus and the second image forming apparatus, and the judgment criterion for the image to be formed in the second image forming apparatus is a step of receiving the image from the print controller in the second image forming apparatus.

Preferably, the image forming system further includes a print controller for performing rasterizing processing to the image to be formed to transmit the image to the first image forming apparatus and the second image forming apparatus, and the judgment criterion for the image to be formed in the second image forming apparatus is a step of rasterizing the image in the print controller.

BRIEF DESCRIPTION OF THE DRAWINGS

The present invention will become more fully understood from the detailed description given hereinbelow and the appended drawings, and thus are not intended as a definition of the limits of the present invention, and wherein.

DETAILED DESCRIPTION OF THE PREFERRED EMBODIMENT

An image forming system according to the present embodiment will be described in detail with reference to drawings. It should be noted that the image forming system according to the present embodiment is an example of the invention of the present application, and the invention of the present application is not necessarily limited thereto.

First, a configuration will be explained.

Figure 1:
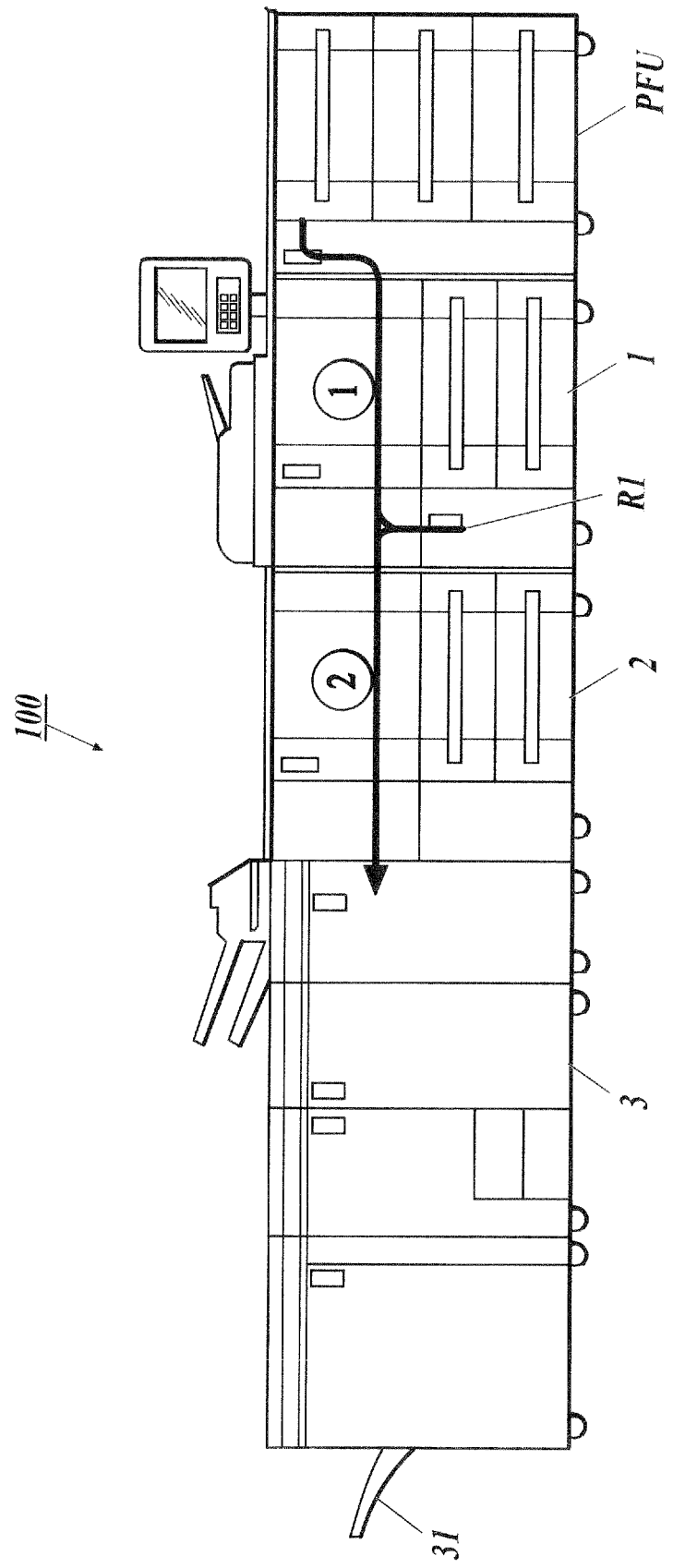
FIG. 1 is a diagram showing an entire configuration of an image forming system and a sheet conveying path.

FIG. 1 is a diagram showing an entire configuration of an image forming system 100 and a sheet conveying path.

As shown in FIG. 1, the image forming system 100 is configured by connecting a sheet feeding tray unit PFU, a first image forming apparatus 1, a second image forming apparatus 2, and a finishing apparatus 3 in this order. The first image forming apparatus 1 has a reversing mechanism R1. An arrow in FIG. 1 denotes a sheet conveying path.

As shown in FIG. 1, for example, when the image forming system 100 performs both-side printing operation, a sheet is fed from the sheet feeding tray unit PFU, and the first image forming apparatus 1 located upstream in sheet conveying direction forms an image on a front surface of the sheet. Thereafter, the image forming system 100 causes the reversing mechanism R1 to reverse the sheet, and conveys the sheet to the second image forming apparatus 2 located downstream in the sheet conveying direction. Then, the image forming system 100 causes the second image forming apparatus 2 to form an image on a back surface of the sheet. After the image forming system 100 forms the image on the back surface of the sheet, the sheet is conveyed to the finishing apparatus 3. The image forming system 100 causes the finishing apparatus 3 to perform finishing on the sheet. For example, the finishing includes multiple folding, saddle stitch, and side stitch. Then, finally, the image forming system 100 discharges the sheet for which both-side printing and finishing has been completed to a sheet discharge tray 31.

Subsequently, the internal configuration of the image forming system 100 will be explained with reference to FIG. 2.

As described above, the image forming system 100 includes the sheet feeding tray unit PFU, the first image forming apparatus 1, and the second image forming apparatus 2. The first and second apparatuses are connected in this order. An arrow denotes a sheet conveying route. In FIG. 2, the finishing apparatus 3 is omitted.

The sheet feeding tray unit PFU includes sheet feeding trays storing a plurality of sheets in three-stage configuration (upper stage, middle stage, and lower stage). The sheet feeding tray unit PFU can separately store sheets different in types, sizes, and the like, in the respective sheet feeding trays. When a sheet feeding instruction is given, the sheet feeding tray unit PFU feeds an appropriate sheet from any one of sheet feeding trays in the three-stage configuration, and conveys the sheet to the first image forming apparatus 1.

The first image forming apparatus 1 includes a sheet feeding section 11, an image forming section 12, a scanner section 13, an operation display section 14, a reversing mechanism R1, and the like.

The sheet feeding section 11 includes sheet feeding trays storing a plurality of sheets in two-stage configuration (upper stage, lower stage). The sheet feeding section 11 can separately store sheets different in types, sizes, and the like, in the respective sheet feeding trays. When a sheet feeding instruction is given, the sheet feeding section 11 feeds an appropriate sheet from any one of sheet feeding trays in the two-stage configuration, and conveys the sheet via a predetermined conveying route to the image forming section 12.

The image forming section 12 includes a photosensitive drum, a charging device, an exposure device (LD), a developing device, a transfer device, a separation device, a cleaning device, a fixing device, and the like.

The image forming section 12 forms an image on a sheet fed and conveyed from the sheet feeding tray unit PFU or the sheet feeding section 11, and thereafter, the fixing device heats and pressurizes the sheet, thereby fixing the image on the sheet.

In the both-side printing operation, the reversing mechanism R1 reverses the front and back sides of the sheet conveyed from the fixing section, and conveys the sheet to the second image forming apparatus 2. On the other hand, in single-side printing operation, the reversing mechanism R1 conveys the sheet to the second image forming apparatus 2 without reversing the front and back sides of the sheet.

Sensors, not shown, are provided on the sheet conveying path, so that the position of a sheet can be detected.

The scanner section 13 includes an automatic document feeder (ADF), platen glass, optical system, and the like. The scanner section 13 uses an optical system to read the original document placed on the ADF or the platen glass.

The operation display section 14 includes a Liquid Crystal Display (LCD), an organic EL display, or the like. On the display, a pressure-sensitive touch panel including transparent electrodes arranged in lattice form is provided. The operation display section 14 displays various kinds of setting screens. The operation display section 14 also receives touch operation performed on the display by a user.

The second image forming apparatus 2 includes an image forming section 22 and the like. Operation of each section is the same as the first image forming apparatus 1, and description thereabout is omitted.

In the both-side printing operation, the second image forming apparatus 2 performs print operation on the sheet conveyed from the first image forming apparatus 1, but in the single-side printing operation, the second image forming apparatus 2 does not perform print operation on the sheet conveyed from the first image forming apparatus 1, and then the second image forming apparatus 2 conveys the sheet to the finishing apparatus 3.

Figure 3:
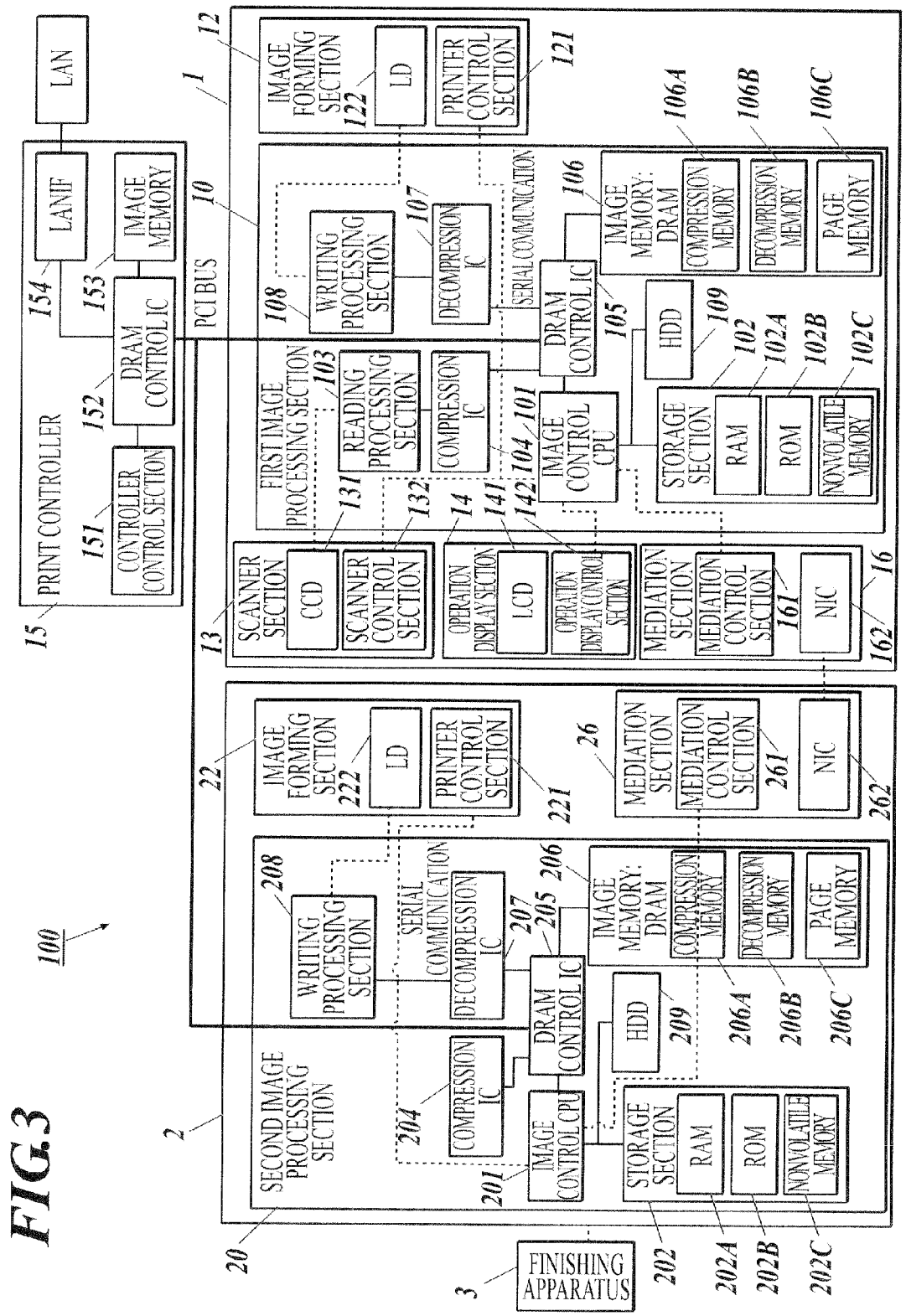
FIG. 3 is a functional block diagram showing the image forming system.

FIG. 3 shows a functional block diagram showing a control system of the image forming system 100.

The first image forming apparatus 1 includes a first image processing section 10, an image forming section 12, a scanner section 13, an operation display section 14, a print controller 15, a mediation section 16, and the like.

The first image processing section 10 includes an image control CPU 101, a storage section 102, a reading processing section 103, a compression IC 104, a DRAM control section IC 105, an image memory 106, a decompression IC 107, a writing processing section 108, an HDD 109, and the like.

The image control CPU 101 expands various kinds of programs stored in a ROM 102B or a nonvolatile memory 102C of the storage section 102 into a RAM 102A, and centrally controls operations of the first image forming apparatus 1 in cooperation with the expanded programs. The image control CPU 101 also centrally controls operations of the second image forming apparatus 2 in cooperation with an image control CPU 201 via a mediation section 16.

For example, the image control CPU 101 functions as a control section for executing a sheet feeding control processing to be explained later, in cooperation with the program stored in the storage section 102, thereby determining whether a predetermined processing step serving as a judgment criterion has been completed with respect to an image to be formed on a subsequent sheet in each of the first image forming apparatus 1 and the second image forming apparatus 2, and when the image control CPU 101 judges that the predetermined processing step serving as the judgment criterion has been completed, the image control CPU 101 performs a control to start image forming operation on the subsequent sheet.

The reading processing section 103 performs various kinds of processes such as analog processing, A/D conversion processing, shading processing, to and analog image signal output from a CCD 131 of the scanner section 13, and generates digital image data. The generated digital image data are output to a compression IC 104.

The compression IC 104 performs compression processing to the digital image data on the basis of control of the DRAM control IC 105. The decompression IC 107 performs decompression processing to the compressed digital image data on the basis of control of the DRAM control IC.

The DRAM control IC 105 controls compression/decompression processing of the digital image data. The DRAM control IC 105 performs input/output control of the compressed/decompressed digital image data to/from the image memory 106.

The image memory 106 includes a compression memory 106A, a decompression memory 106B, and a page memory 106C, composed of a dynamic RAM (DRAM), and temporarily stores compressed image data and decompressed image data.

The writing processing section 108 outputs the decompressed digital image data to the image forming section 12.

The HDD 109 saves and reads image data on the basis of the control of the image control CPU 101.

Figure 2:
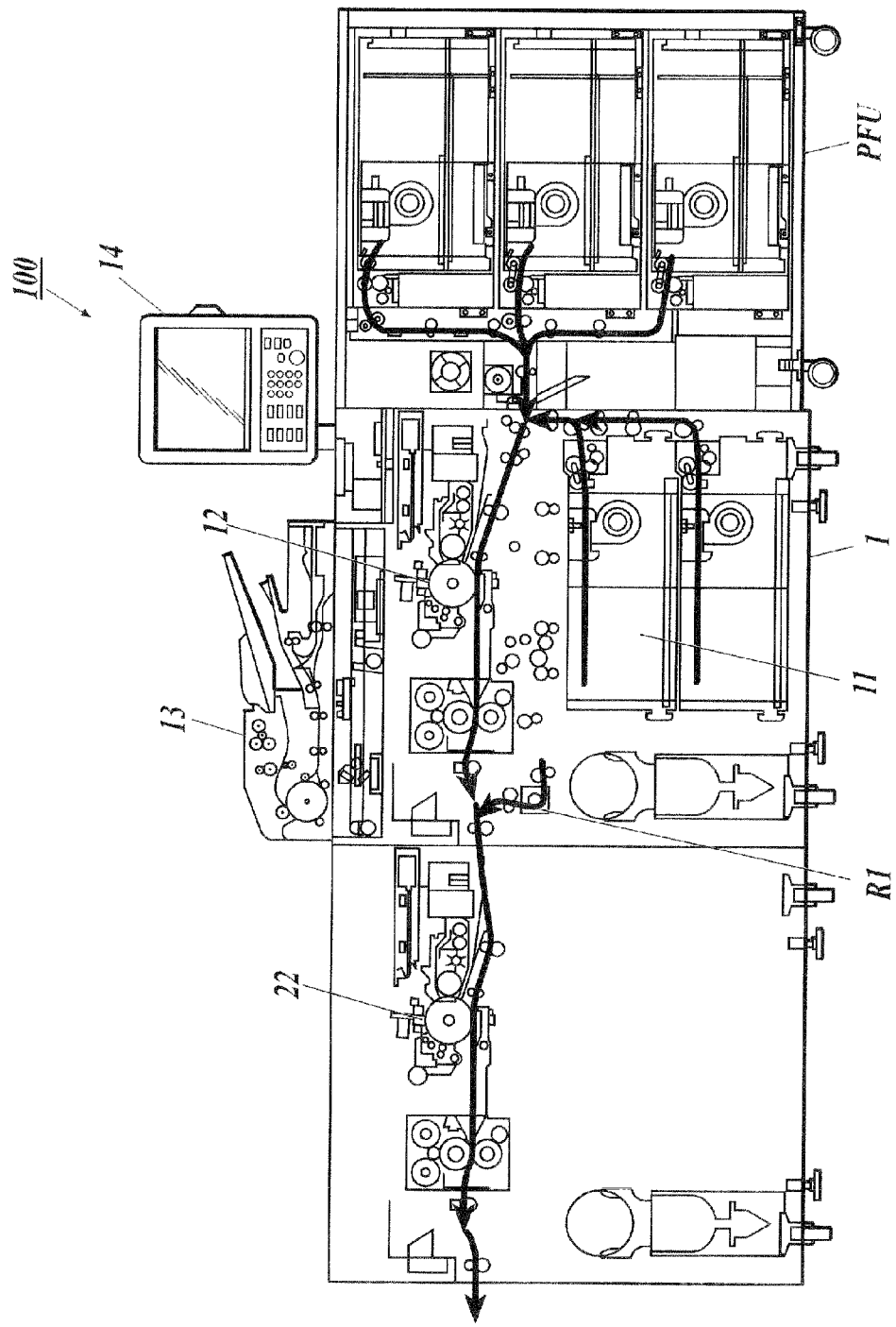
FIG. 2 is a diagram showing an internal configuration of the image forming system.

The image forming section 12 includes a printer control section 121 and an LD 122, and the photosensitive drum, the charging device, the exposure device (LD), the developing device, the transfer device, the separation device, the cleaning device, the fixing device, and the like which are shown in FIG. 2. Each section of the image forming section 12 operates under the control of the printer control section 121. The image forming section 12 forms an electrostatic latent image by causing the LD 122 to emit laser light on the photosensitive drum surface on the basis of the digital image data input from the writing processing section 108, and attaches toner to a region including the electrostatic latent image on the photosensitive drum surface. Then, the toner is transferred to a recording medium conveyed from the sheet feeding section 11 to form an image on the recording medium. Then, the image is fixed by the fixing device, and the recording medium is discharged.

The scanner section 13 includes a Charge Coupled Device (CCD) 131, a scanner control section 132, and the like. The scanner section 13 reads an original document placed on the ADF or the platen glass, and outputs the read analog image signal to the reading processing section 103.

The operation display section 14 includes an LCD 141 (or organic EL display), an operation display control section 142, and the like. The operation display section 14 displays various kinds of setting screens, and receives various kinds of operations from a user. When the operation display section 14 receives an operation from a user, the operation display section 14 generates an operation signal, and outputs the generated operation signal to the image control CPU 101.

The print controller 15 includes a controller control section 151, a DRAM control IC 152, an image memory 153, a LANIF 154, and the like.

The controller control section 151 centrally controls an operation of each section of the print controller 15. The controller control section 151 performs RIP processing (rasterizing processing) for analyzing print data input from an external apparatus via the LANIF 154 to convert the print data into print mode data representing image formation conditions and image data (bit map data).

The DRAM control IC 152 performs a control to output the print data received by the LANIF 154 to the controller control section 151, and temporarily store the image data input from the controller control section 151 to the image memory 153 in accordance with the instruction provided by the controller control section 151. The DRAM control IC 152 is connected to the DRAM control IC 105 of the first image forming apparatus 1 and the DRAM control IC 205 of the second image forming apparatus 2 via a Peripheral Components Interconnect (PCI) bus. In accordance with an instruction given by the controller control section 151, the DRAM control IC 152 reads the image data from the image memory 153, and outputs the read image data to the DRAM control IC 105 and the DRAM control IC 205.

The mediation section 16 includes a mediation control section 161, a Network Interface Card (NIC) 162, and the like. The mediation section 16 transmits and receives various pieces of information to/from a mediation section 26 of the second image forming apparatus 2.

The second image forming apparatus 2 includes a second image processing section 20, an image forming section 22, a mediation section 26, and the like. The processing of each section of the second image forming apparatus 2 is the same as the processing of each section having the same name explained in the first image forming apparatus 1, and description thereabout is omitted here.

In the present embodiment, the scanner section 13 is connected to the first image forming apparatus 1 and is not connected to the second image forming apparatus 2. However, the configuration is not limited thereto. The second image forming apparatus 2 may also have the scanner section 13.

Hereinafter, a rough flow of processing steps from image input to image output in the image forming system 100 will be explained with reference to FIG. 4.

First, the LANIF 154 of the print controller 15 receives print data (step S1). For example, the print data are Page Description Language data (PDL data).

The received print data are output to the controller control section 151 of the print controller 15, and linguistic analysis processing and rasterizing processing are performed to the print data to generate the image data and print mode data for each page (step S2). The print mode data are data of image formation conditions about an image resolution, a sheet, and the like.

The generated print mode data and the generated image data are output via the PCI bus, and are received by the DRAM control IC 105 and the DRAM control IC 205 (step S3). The received print mode data are output to the image control CPU 101, and the image control CPU 101 generates job data (step S4). Meanwhile, the generated image data for each page are output to the compression IC 104 of the first image processing section 10, where the image data are compressed (step S5). Likewise, the image data are output to a compression IC 204 of the second image processing section 20 via the PCI bus and the DRAM control IC 205, where the image data are compressed.

At this occasion, when the image control CPU 101 generates job data, the image control CPU 101 informs, to the image control CPU 201 via the mediation section 16, a page number and setting information (image formation condition and the like) of image formation target in the second image forming apparatus 2. As necessary, a processing start time of each process, an operation condition of the first image forming apparatus 1, and the like are informed to the image control CPU 201. The image control CPU 201 informs a current operation condition and the like to the image control CPU 101 via the mediation section 26 with a regular interval of time. As described above, the first image forming apparatus 1 and the second image forming apparatus 2 operate by cooperating with each other.

While the image control CPU 101 of the first image forming apparatus 1 and the image control CPU 201 of the second image forming apparatus 2 cooperate with each other as described above, the processing steps of step S5 and subsequent steps are performed in parallel by each of the apparatuses under the control of the image control CPU thereof.

In the explanation below, a case where processing is performed in the first image forming apparatus 1 will be explained. The same processing is performed also in the second image forming apparatus 2.

The image data (compressed image data) compressed by the compression IC 104 are temporarily stored in the compression memory 106A (step S6), and are thereafter transferred and saved in the HDD 109, i.e., a large capacity storage device (step S7).

The compressed image data saved in the HDD 109 are read according to image formation timing in the image forming section 12, and are stored in the decompression memory 106B (step S8). Then, the decompression IC 107 performs decompression processing (step S9), and the decompressed image data are stored in the page memory 106C (step S10). The decompressed image data stored in the page memory 106C are read by the writing processing section 108 according to image formation timing in the image forming section 12, and are output to the image forming section 12 (step S11). The image forming section 12 forms an image on a sheet on the basis of the image output from the writing processing section 108 (step S12).

A conventional image forming apparatus starts sheet feeding to start image forming operation after waiting until an image to be subsequently formed attains an image preparation completion state. The image preparation completion state means a state in which an image can be used when the image is needed in the image forming section. For example, the image preparation completion state means a state in which image data have been stored in a page memory. When image output to the image forming section cannot be started at a desired time, the sheet is stopped at a position before the writing operation, and subsequent sheet catches up with the preceding sheet, which causes jam and reduces productivity. The reason why the conventional image forming apparatus waits for the image preparation completion state is to avoid the above drawback. In the both-side printing operation, the conventional image forming apparatus starts sheet feeding after waiting until not only the image for the front surface of the subsequent sheet but also the image for the back surface attain the image preparation completion state.

However, in the image forming system 100 which includes the two image forming apparatuses connected in series, each of which has the image processing section and the image forming section, and in which the first image forming apparatus located upstream in the sheet conveying direction forms an image on the front surface of the sheet and the second image forming apparatus located downstream in the sheet conveying direction forms an image on the back surface of the sheet, the position of the first image forming apparatus and the position of the second image forming apparatus are different in the sheet conveying direction from each other. Therefore, the image to be formed on the sheet by the second image forming apparatus located downstream does not necessarily attain the image preparation completion state when the image forming operation starts. This is because in the first image forming apparatus and the second image forming apparatus, the image processing section and the image forming section are independent, and therefore, processing can be performed in parallel, so that, for example, even if preparation of the second image forming apparatus is delayed depending on the image file or the storage position in the HDD, a time for preparing the image to be formed in the second image forming apparatus can be ensured from when the sheet is fed to when the sheet is conveyed to the writing position of the second image forming apparatus. In the judgment of the start of sheet feeding, if the processing step which is expected to have been done on the image to be formed on a subsequent sheet in the second image forming apparatus are adopted as the steps in the stage previous to the first image forming apparatus, the sheet can be fed in a shorter time and the productivity can be improved, as compared with a case where the sheet feeding determination conditions of them both require the completed state of the processing step in step S10 in FIG. 4.

Accordingly, in the image forming system 100 according to the present embodiment, the processing step serving as the judgment criterion for starting sheet feeding operation is changed for the image to be formed in the first image forming apparatus 1 and the image to be formed in the second image forming apparatus 2. More specifically, the processing step serving as the sheet feeding judgment criterion for the image to be formed in the second image forming apparatus 2 is located in the step previous to the processing step serving as the judgment criterion for starting sheet feeding operation for the image to be formed in the first image forming apparatus.

Figure 5:
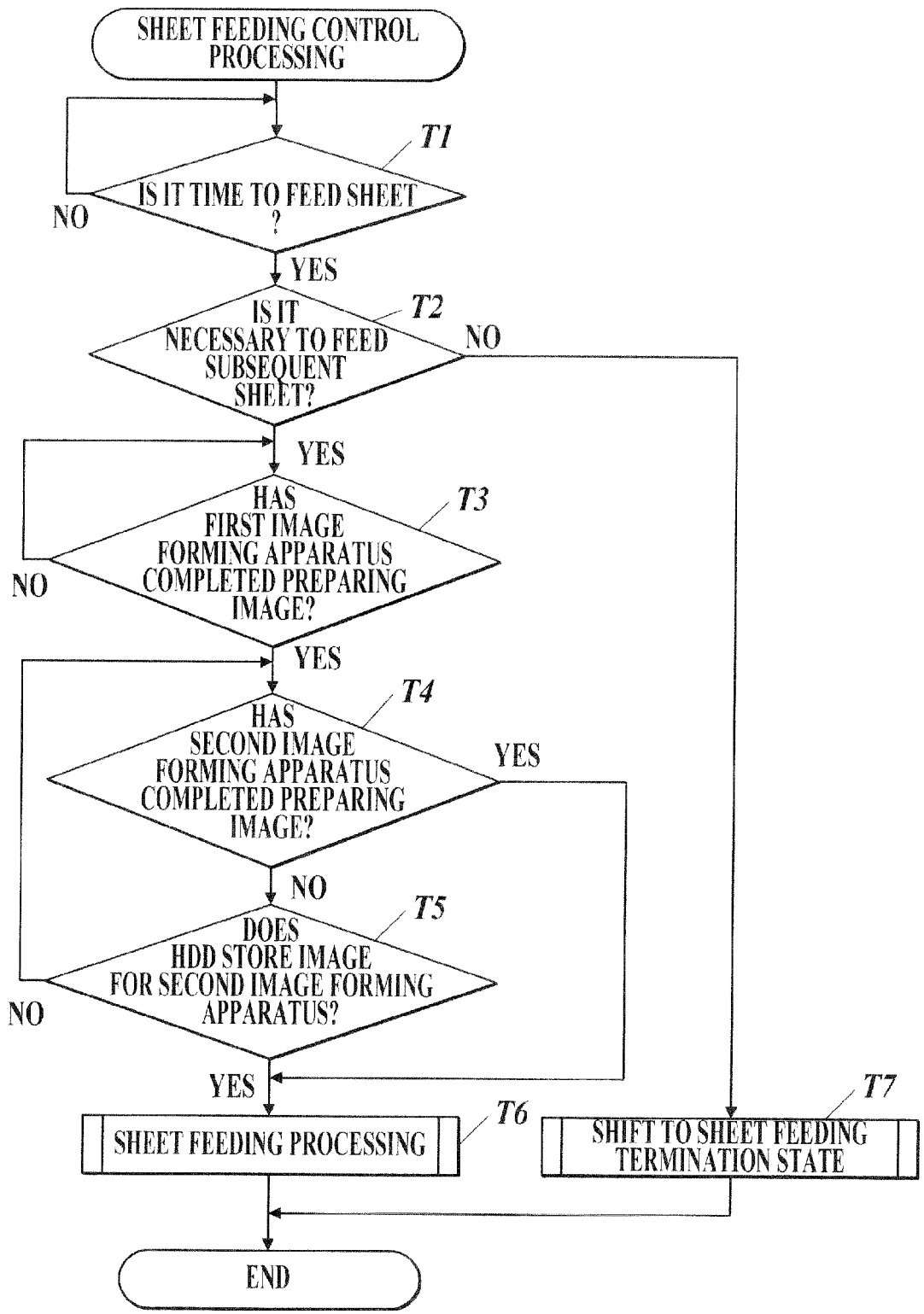
FIG. 5 is a flowchart showing a sheet feeding control processing executed by an image control CPU of a first image forming apparatus.

FIG. 5 is a flowchart showing a sheet feeding control processing executed by the image control CPU 101 of the first image forming apparatus 1. The sheet feeding control processing is achieved by cooperation between the image control CPU 101 and the program stored in the storage section 102.

First, whether a sheet-feeding-judgment timing has come is judged (step T1). For example, when a certain period of time has passed since a preceding sheet was fed, or when the preceding sheet is conveyed to a predetermined position, it is judged that the sheet-feeding-judgment timing has come. When it is judged that the sheet-feeding-judgment timing has not come (step T1; NO), the apparatus waits until the sheet-feeding-judgment timing comes. When it is judged that the sheet-feeding-judgment timing for a subsequent sheet has come (step T1; YES), step T2 is subsequently performed.

In step T2, whether sheet feeding for a subsequent sheet is necessary is judged (step T2). For example, whether the sheet feeding for a subsequent sheet is necessary is judged by referring to the number of sets set in job data, presence/absence of the sheet in the sheet feeding tray, an alarm state, and the like. When it is judged that the sheet feeding for a subsequent sheet is not necessary (step T2; NO), the apparatus shifts to sheet feeding termination state (step T7).

When it is judged that the sheet feeding for a subsequent sheet is necessary (step T2; YES), whether an image to be formed on the subsequent sheet in the first image forming apparatus 1 has attained image preparation completion state is judged (step T3). More specifically, whether the processing in step S10 shown in FIG. 4 (storing the image in the page memory 106C) has been completed is judged with respect to the image to be formed on the subsequent sheet in the first image forming apparatus 1. When it is judged that the image to be formed on the subsequent sheet in the first image forming apparatus 1 has not yet attained the image preparation completion state (step T3; NO), the apparatus waits until it attains the image preparation completion state.

When it is judged that the image to be formed on the subsequent sheet in the first image forming apparatus 1 has attained the image preparation completion state (step T3; YES), whether the image to be formed on the subsequent sheet in the second image forming apparatus 2 has attained the image preparation completion state is judged (step T4). More specifically, whether the processing in step S10 shown in FIG. 4 (storing the image in the page memory 206c) has been completed is judged with respect to the image to be formed on the subsequent sheet in the second image forming apparatus 2. When it is judged that the image to be formed on the subsequent sheet in the second image forming apparatus 2 has attained the image preparation completion state (step T4; YES), the sheet feeding section 11 starts sheet feeding, and the image forming operation starts (step T6).

On the other hand, when it is judged that the image to be formed on the subsequent sheet in the second image forming apparatus 2 has not yet attained the image preparation completion state (step T4; NO), whether the image to be formed on the subsequent sheet in the second image forming apparatus 2 has been saved to an HDD 209 is judged (step T5). That is, whether the processing step in step S7 in FIG. 4 has been completed is judged. When it is judged that the image to be formed on the subsequent sheet in the second image forming apparatus 2 has not yet been saved to the HDD 209 (step T5; NO), step T4 is performed again. When it is judged that the image to be formed on the subsequent sheet in the second image forming apparatus 2 has been saved to the HDD 209 (step T5; YES), the sheet feeding section 11 starts sheet feeding, and the image forming operation start (step T6).

Figure 4:
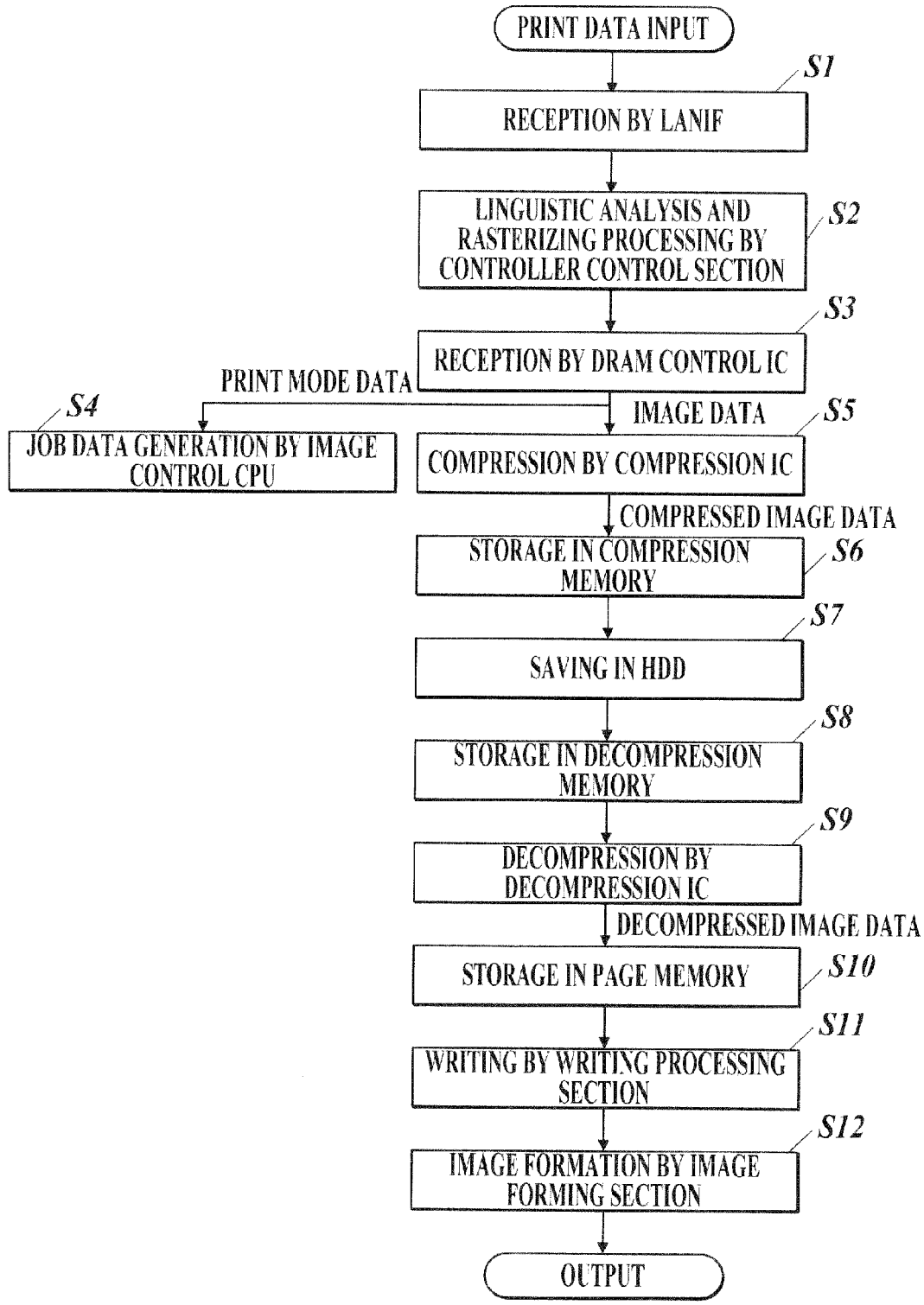
FIG. 4 is a diagram showing a flow of processing steps from image input to image output in the image forming system.

In the above sheet feeding control processing, the judgment criterion for starting sheet feeding operation for the image to be formed in the first image forming apparatus 1 is the completion of processing in step S10 shown in FIG. 4, and the judgment criterion for starting sheet feeding operation for the image to be formed in the second image forming apparatus 2 is the completion of processing in step S7 shown in FIG. 4. Therefore, for example, even when the image preparation completion state is not attained at the sheet-feeding-judgment timing due to delay of, e.g., transfer of the image to be formed in the second image forming apparatus 2 from the HDD 209, the sheet feeding operation starts as long as the processing step is performed which can attain image preparation completion state within a sheet conveying time because, e.g., the image is saved to the HDD 209. Therefore, the image forming operation can be started in a shorter time, and the productivity can be improved.

In FIG. 5, the judgment criterion for starting sheet feeding operation for the image to be formed in the second image forming apparatus 2 is the completion of saving of the image to the HDD 209, i.e., the completion of the processing step of step S7 of FIG. 4. However, the productivity can be improved as long as the judgment criterion for sheet feeding operation is a step prior to step S10 of FIG. 4 attaining the image preparation completion state, and the judgment criterion is not limited thereto. For example, in accordance with processing performance of the second image forming apparatus 2, the judgment criterion for starting sheet feeding operation for the image to be formed in the second image forming apparatus 2 may be a state in which the image to be formed has been received from the print controller 15 (step S3 of FIG. 4), or if the processing performance is higher, it may be a state in which the print controller 15 has completed the rasterizing processing (step S2 of FIG. 4).

As described above, according to the image forming system 100, when the image control CPU 101 judges that the image to be formed in the first image forming apparatus 1 is in the image preparation completion state (the state in which the image has been stored in the page memory 106C) and that the image to be formed in the second image forming apparatus 2 is in the image preparation completion state (the state in which the image has been stored in the page memory 206c) or the saving step to the HDD 209 has been completed, the sheet feeding section 11 is caused to start feeding a sheet, and the image forming operation is started.

Therefore, even if the image to be formed on the subsequent sheet in the second image forming apparatus 2 has not yet attained the image preparation completion state, when the image has been saved to the HDD 209, the image forming operation starts. Therefore, as compared with the conventional apparatus, the start time of the image forming operation is earlier, which improves the productivity.

It should be noted that the description about the above embodiment shows a preferred example of an image forming system according to the present invention, and the present invention is not limited thereto.

For example, the image forming system according to the present invention is not limited to a configuration in which the sheet feeding tray unit PFU, the first image forming apparatus 1, the second image forming apparatus 2, the finishing apparatus 3, and the like are independently provided and connected with each other. Alternatively, the sheet feeding tray unit PFU, the first image forming apparatus 1, the second image forming apparatus 2, the finishing apparatus 3, and the like may be integrally configured.

In the above explanation, an example where a ROM, a nonvolatile memory, a hard disk, and the like are used as computer-readable media for the program according to the present invention has been disclosed. However, the present invention is not limited to this example. A portable recording medium such as a CD-ROM may be applied as another example of a computer-readable medium. In addition, as a medium to provide data of the program of the present invention through communication lines, a carrier wave can be applied to the present invention.

In addition, detailed configuration and detailed operation of each device can be changed as necessary without deviating from the gist of the present invention.

The present U.S. patent application claims a priority under the Paris Convention of Japanese patent application No. 2010-238187 filed on Oct. 25, 2010, in which all contents of this application are disclosed, and which shall be a basis of correction of an incorrect translation.

What is claimed is:

1. An image forming system comprising:
a first image forming apparatus located upstream in a sheet conveying direction; and
a second image forming apparatus located downstream in the sheet conveying direction,
wherein the first image forming apparatus forms an image on a first surface of a sheet, and thereafter the second image forming apparatus forms an image on a second surface of the sheet, thus performing a both-side printing operation,
wherein a same image forming preparation process is respectively performed for an image to be formed in the first image forming apparatus and for an image to be formed in the second image forming apparatus, the image forming preparation process comprising a plurality of successive steps which are performed in sequence, and at least a part of the image forming preparation process being performed in parallel for the image to be formed in the first image forming apparatus and the image to be formed in the second image forming apparatus, wherein the image forming system further comprises a control section for judging whether a predetermined step serving as a judgment criterion among the plurality of successive steps of the image forming preparation process has been completed for an image to be formed on a subsequent sheet in each of the first image forming apparatus and the second image forming apparatus, wherein the predetermined step serving as the judgment criterion in the image forming preparation process for the image to be formed in the second image forming apparatus is a step among the plurality of successive steps of the image forming preparation process that is earlier in the sequence of the image formation preparation process than the predetermined step serving as the judgment criterion in the image forming preparation process for the image to be formed in the first image forming apparatus, wherein the control section performs control to start an image forming operation on the subsequent sheet when the control section judges that the predetermined steps serving as the judgment criteria have been completed in the image formation preparation process for the image to be formed on the subsequent sheet in each of the first image forming apparatus and the second image forming apparatus.

2. The image forming system of claim 1, wherein when the control section judges that the predetermined steps serving as the judgment criteria have been completed in the image formation preparation process for the image to be formed on the subsequent sheet in each of the first image forming apparatus and the second image forming apparatus, the control section performs control to start feeding the subsequent sheet.

3. The image forming system of claim 1, further comprising a hard disk for saving the image to be formed, wherein the predetermined step serving as the judgment criterion in the image formation preparation process for the image to be formed in the second image forming apparatus is a step of saving the image to the hard disk.

4. The image forming system of claim 1, further comprising a print controller for performing rasterizing processing to the image to be formed to transmit the image to the first image forming apparatus and the second image forming apparatus, wherein the predetermined step serving as the judgment criterion in the image formation preparation process for the image to be formed in the second image forming apparatus is a step of receiving the image from the print controller in the second image forming apparatus.

5. The image forming system of claim 1, further comprising a print controller for performing rasterizing processing to the image to be formed to transmit the image to the first image forming apparatus and the second image forming apparatus, wherein the predetermined step serving as the judgment criterion in the image formation preparation process for the image to be formed in the second image forming apparatus is a step of rasterizing the image in the print controller.

* * * * *